United States Patent
Musseau

(10) Patent No.: US 11,461,461 B2
(45) Date of Patent: Oct. 4, 2022

(54) SYSTEMS AND METHODS FOR MANAGING AND SECURING COMPUTER SYSTEMS

(71) Applicant: Mergebase Software Inc., Coquitlam (CA)

(72) Inventor: Julius William Musseau, Abbotsford (CA)

(73) Assignee: Mergebase Software Inc., Coquitlam (CA)

(*) Notice: Subject to any disclaimer, the term of this patent is extended or adjusted under 35 U.S.C. 154(b) by 310 days.

(21) Appl. No.: 16/650,705

(22) PCT Filed: Jul. 17, 2019

(86) PCT No.: PCT/CA2019/050991
§ 371 (c)(1),
(2) Date: Mar. 25, 2020

(87) PCT Pub. No.: WO2020/014787
PCT Pub. Date: Jan. 23, 2020

(65) Prior Publication Data
US 2021/0157905 A1    May 27, 2021

Related U.S. Application Data

(60) Provisional application No. 62/699,108, filed on Jul. 17, 2018.

(51) Int. Cl.
| | |
|---|---|
| G06F 21/00 | (2013.01) |
| G06F 21/54 | (2013.01) |
| G06F 9/4401 | (2018.01) |
| G06F 21/57 | (2013.01) |

(52) U.S. Cl.
CPC .............. G06F 21/54 (2013.01); G06F 9/442 (2013.01); G06F 21/577 (2013.01); *G06F 2221/033* (2013.01)

(58) Field of Classification Search
None
See application file for complete search history.

(56) References Cited

U.S. PATENT DOCUMENTS

| | | |
|---|---|---|
| 6,266,654 B1 | 7/2001 | Schull |
| 8,359,572 B2 | 1/2013 | Mital et al. |
| 8,844,043 B2 | 9/2014 | Williams et al. |

(Continued)

OTHER PUBLICATIONS

Lin, Chin-yang et al. A graph-based approach for automatic service activation and deactivation on the OSGi platform. IEEE Transactions on Consumer Electronics, vol. 55, Issue: 3. https://ieeexplore.ieee.org/stamp/stamp.jsp?tp=&arnumber=5277987 (Year: 2009).*

(Continued)

*Primary Examiner* — Jeremiah L Avery
(74) *Attorney, Agent, or Firm* — Oyen Wiggs Green & Mutala LLP

(57) ABSTRACT

Systems and method for managing and securing computer systems are disclosed, wherein a method comprises: making a function call to a target function of a software component; calling, by the target function, a gateway function; querying, by the gateway function, an activation setting; and terminating, by the gateway function, the function call to the target function if the activation setting indicates an inactive status.

20 Claims, 15 Drawing Sheets

(56) References Cited

U.S. PATENT DOCUMENTS

| | | | |
|---|---|---|---|
| 9,342,300 B2 | 5/2016 | Kwon et al. | |
| 2006/0004737 A1 | 1/2006 | Grzonka | |
| 2006/0185018 A1 | 8/2006 | Saretto et al. | |
| 2009/0276771 A1* | 11/2009 | Nickolov | H04L 67/1008 |
| | | | 718/1 |
| 2010/0024035 A1 | 1/2010 | Wallace | |
| 2010/0162398 A1 | 6/2010 | Karecha et al. | |
| 2013/0132854 A1* | 5/2013 | Raleigh | H04M 15/77 |
| | | | 715/738 |
| 2014/0181896 A1 | 6/2014 | Yablokov et al. | |
| 2014/0373171 A1* | 12/2014 | Grocutt | G06F 21/74 |
| | | | 726/27 |
| 2015/0213271 A1 | 7/2015 | Stella et al. | |
| 2017/0098087 A1* | 4/2017 | Li | H04L 63/1416 |
| 2017/0109391 A1 | 4/2017 | Rosen et al. | |
| 2017/0201850 A1* | 7/2017 | Raleigh | H04W 4/50 |
| 2017/0372072 A1 | 12/2017 | Baset et al. | |

OTHER PUBLICATIONS

Pal, Yash et al. Maximize the Lifetime of Object Tracking Sensor Network with Node-to-Node Activation Scheme. 2009 IEEE International Advance Computing Conference. https://ieeexplore.ieee.org/stamp/stamp.jsp?tp=&arnumber=4809186 (Year: 2009).*

* cited by examiner

FIG. 10A

```
  IE3205538320091759852.class
  Decompiled .class file. bytecode version: 47.0 (Java 1.3 or older)                                    Download...  Choose Sources...
1  /*...*/
5  package mergebase;
6
7  import
8
15 public class IE3205538320091759852 {
16   public static String ACTIVE_MITIGATION = "no_action";
18   static final Map IE_STATS = new HashMap();
19   private static final String MB_APPLICATION = "mb_application";
20   public static Integer COUNTER;
21
22   private IE3205538320091759852() {
23   }
25
26   public static void ping(String className, String method, String signature) {
27     if ("kill".equals(ACTIVE_MITIGATION)) {
28       throw new RuntimeException("MERGEBASE KILL MITIGATION via call to " + className + ", " + method + signature);
29     } else {
30       Integer var3 = COUNTER;
31       COUNTER = COUNTER + 1;
32     }
33   }
   ...
47   public static void setNoAction() { setMitigation("no_action"); }
50   public static void setMonitor() { setMitigation("surveil"); }
54   public static void setKill() { setMitigation("kill"); }
58   private static void setMitigation(String mitigation) {
59     if (!ACTIVE_MITIGATION.equals(mitigation)) {
```

220

1200 — (lines 17-20)
1300 — (line 22)
1400 — (line 25)

FIG. 10B

SYSTEMS AND METHODS FOR MANAGING AND SECURING COMPUTER SYSTEMS

REFERENCE TO RELATED APPLICATIONS

This application claims priority from application No. U.S. 62/699,108, filed 17 Jul. 2018. For purposes of the United States, this application claims the benefit under 35 U.S.C. § 119 of application No. U.S. 62/699,108, filed 17 Jul. 2018, and entitled SOFTWARE COMPONENT PROVENANCE INJECTION VIA SOURCE CODE MUTATION which is hereby incorporated herein by reference for all purposes.

TECHNICAL FIELD

This invention relates to systems and methods for managing and securing computer systems. More specifically, this invention relates to methods of modifying computer software and operating modified computer software to manage and secure computer systems as well as to computer systems which incorporate components which provide management and/or security functions.

BACKGROUND

Modern computer systems are built from a large number of hardware and software components. The hardware components may include processors, memory, and network adapters, and are assembled into hardware platforms to store and execute the software components. The software components may include operating systems, applications, and one or more libraries. For example, a computer system for providing a blog may use a hardware platform comprising a memory storing one or more software components, a processor for executing the software components, and a network adapter for sending and receiving instructions to and from the software components. The software components may include an operating system, a webserver, a database server, a web application, a database, and one or more libraries.

More complex computer systems may employ multiple hardware platforms, where each of the hardware platforms has a memory storing one or more software components. The software components stored in different hardware platforms may be the same or different. Two software components may by different in that:
- they are entirely different software components, for example a Java™ java.lang package versus a Java™ java.math package;
- they are different implementations of the same type of software component, for example a Java™ java.math package versus a C++ cmath library;
- they are different versions of the same implementation of a software component, for example two different versions of a java.lang package; or
- they are the same version of the same implementation of a software component, but have had different patches installed.

For example, a computer system may include two hardware platforms, where the first hardware platform stores and executes an operating system, webserver and web application, and the second hardware platform stores and executes the same operating system and a database. More complex computer systems may include multiple hardware platforms storing and executing the same software components, for example multiple hardware platforms each storing and executing the same operating system, webserver and web application.

A hardware platform may also store and execute multiple copies of the same software component, for example two copies of the same webserver.

Software components are regularly updated for various reasons, including to add new features, fix bugs, and patch security vulnerabilities. A software component may be updated by patching a version of the software component stored in a memory, or by deleting the software component stored in the memory and copying a new version of the software component into the memory. Different copies of a software component may be updated at different times. For example, a new release of a webserver may gradually replace an older version of the webserver across a network of hardware platforms, or a patch may be installed on a subset of webservers. Furthermore, older versions of software components may be retained to run legacy systems.

The proliferation of software components across a computer system, inconsistent updating and patching of software components, and deliberate retention of older versions of software components, lead to different versions of software components being stored and executed in the computer system. Accordingly, tracking and maintaining software components within a computer system may become logistically complex and administratively taxing.

One reason for updating and patching software components is to fix security vulnerabilities. Examples of vulnerabilities in software components include:
- memory safety violations such as buffer overflows and dangling pointers;
- input validation errors which may permit exploits such as code injection, cross-site scripting and SQL injection;
- broken authentication and session management; and
- privilege-confusion bugs which may permit exploits such as clickjacking and cross-site request forgeries.

A software component containing a vulnerability may be referred to as a compromised software component. When a vulnerability is discovered in a software component, the provider of the software component typically releases a patch to modify the software component and remove the vulnerability. The patch must then be applied to all copies of the software component which contain the vulnerability. Ideally, when various versions of the software component are installed in a computer system, all installations of the software component should be inventoried, those software components containing the vulnerability should be identified, and the patch should then be applied to those software components containing the vulnerability.

In a modern computer system containing hundreds or thousands of software components, merely inventorying all of the software components can require substantial time and resources. Furthermore, software components may be changing as they are being inventoried, for example as capacity and/or new functionality is added to the computer system.

Once all of the installations of a software component are inventoried, the patch must be applied to all compromised software components. For various reasons, not all compromised software components can always be patched simultaneously. Accordingly, compromised software components are frequently patched in batches. This may lead to a computer system containing multiple versions of the same software component with different patches applied to different installations of the software component.

When a patch is released to fix a vulnerability in a software component, every installation of that software component must be updated with the patch to avoid possible exploitation of the vulnerability. Consequently, the administrators of a computer system are presented with the daunting task of monitoring all software components used in the computer system, and ensuring that all software components in the computer system are promptly updated when a patch is released. Administrators of smaller software systems may not have the capacity for monitoring and updating their software components, leading to known vulnerabilities persisting in their computer systems. Larger computer systems may become exceedingly onerous to monitor and update, requiring massive resources to effectively manage and secure.

There is a general desire for improved systems and method for managing and securing computer systems.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for securely operating a computer system, the method comprising: making a function call to a target function of a software component; calling, by the target function, a gateway function; querying, by the gateway function, an activation setting; and terminating, by the gateway function, the function call to the target function if the activation setting indicates an inactive status.

In some embodiments the method further comprises returning, by the gateway function, to the target function if the activation setting indicates the target function is inactive.

In some embodiments the target function is a function of a software library, and the activation setting indicates an activation status of the software library.

In some embodiments terminating the function call comprises shutting down the computer system.

In some embodiments terminating the function call comprises: identifying, by the gateway function, a data type expected to be returned by the target function; generating, by the gateway function, a default value of the data type; returning, by the gateway function, the default value; and terminating, by the gateway function, the function call to the target function.

In some embodiments terminating the function call comprises: returning, by the gateway function, an exception; and terminating, by the gateway function, the function call to the target function.

Another aspect of the invention provides a method for securing a software component, the method comprising: adding a gateway function to the software component; modifying at least one base function of the software component to call the gateway function; querying a vulnerability database for a list of vulnerabilities contained in the software component; and setting an activation setting to indicate an inactive status if the list of vulnerabilities contained in the software component contains at least one vulnerability; wherein the gateway function is configured to query the activation setting and terminate the base function if the activation setting indicates an inactive status.

Another aspect of the invention provides a computer system comprising: a control unit; and a hardware platform communicatively coupled to the control unit; wherein the hardware platform is configured to execute a plurality of software components, wherein each of the software components comprises: a gateway function; and at least one base function configured to call the gateway function; and wherein the gateway function is configured to query an activation setting and terminate the base function if the activation setting indicates an inactive status; and wherein the control unit is configured to set the activation setting.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 10A depicts a plurality of base functions modified in accordance with an example embodiment.

FIG. 10B depicts a gateway function according to an example embodiment.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1A:
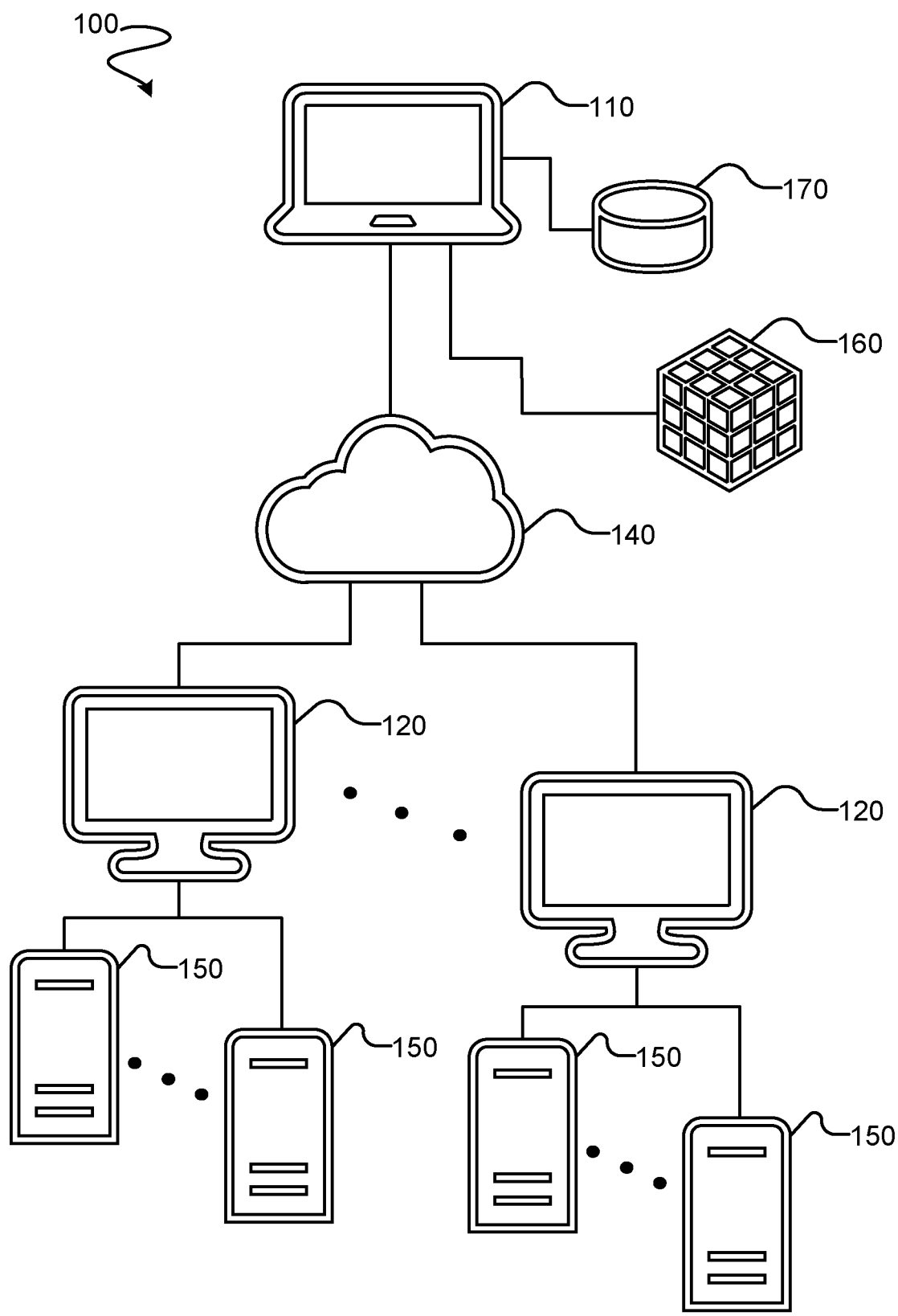
FIG. 1A is a schematic diagram of a computer system according to an example embodiment.
Figure 1B:
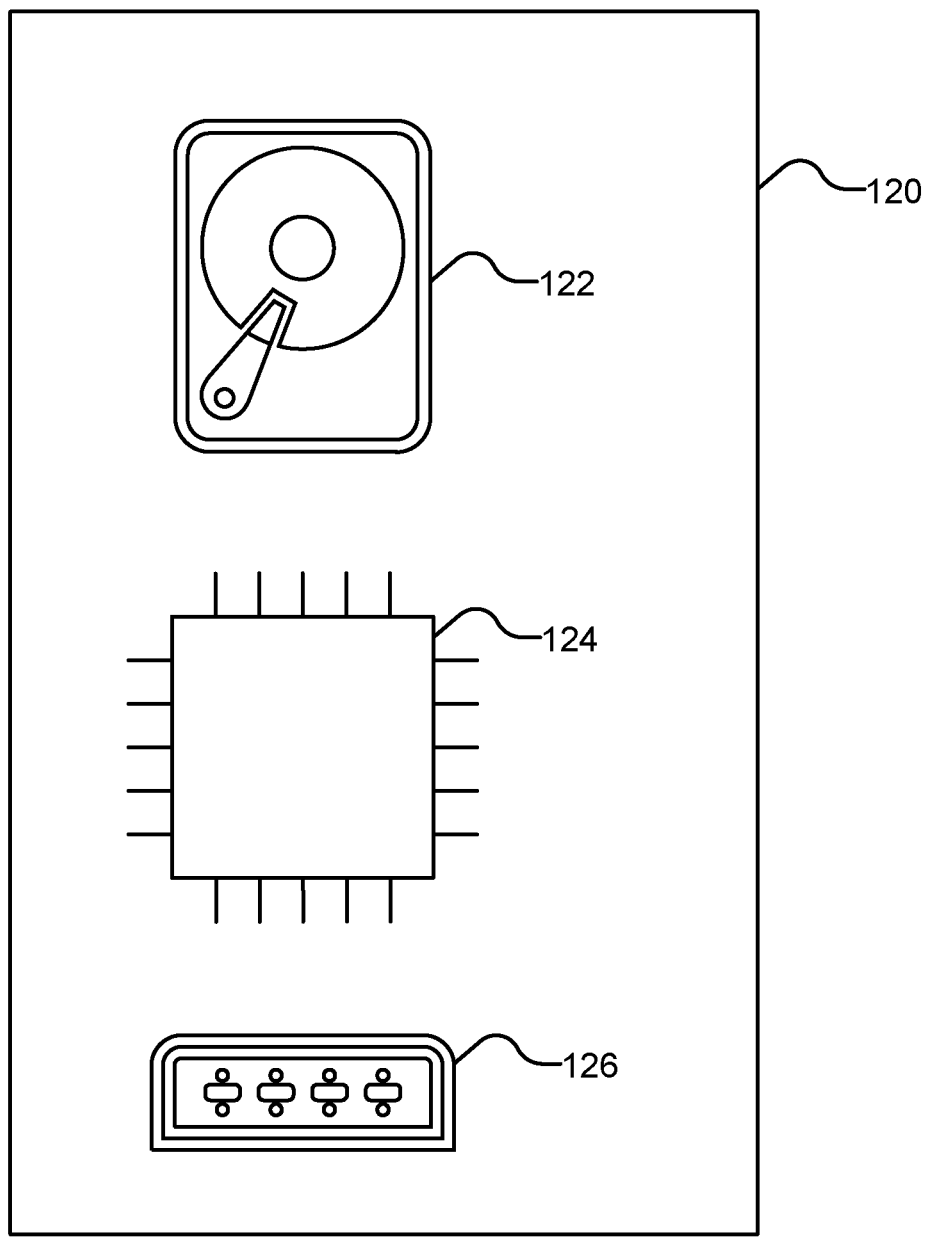
FIG. 1B is a schematic diagram of a hardware platform according to an example embodiment.

FIG. 1A is a schematic diagram of an embodiment of computer system 100 comprising control unit 110 and one or more hardware platforms 120. Each of hardware platforms 120 comprises memory 122, processor 124, and network adapter 126, depicted in FIG. 1B. Memory 122 of hardware platforms 120 may store software instructions for execution by the respective processor 124 of each hardware platform 120. The network adapter 126 of each hardware platform 120 may communicate with other network adapters 126 and control unit 110 via network 140. Network 140 may comprise a local area network, the internet, or any other network capable of facilitating communication between network adapters 126 and control unit 110. In some embodiments, network 140 may comprise a shared memory, for example a shared random access memory (RAM).

In some embodiments, one or more of hardware platforms 120 may comprise two or more network adapters 126. In some embodiments, network adapters 126 may comprise one or more of a real network adapter 126A and a virtual network adapter 126B (not shown). A real network adapter 126A may be configured to communicate with any other real network adapter 126A and/or control unit 110 via network 140. A virtual network adapter 126B may not be able to communicate with any real network adapter 126A, any other virtual network adapter 126B, or control unit 110. A virtual network adapter 126B may be configured to send and receive communications within the hardware platform which it is part of.

Stored on memories 122 of hardware platforms 120 are software components 150. In some embodiments, software components 150 comprise files containing executable or interpretable software code, for example executables and libraries. Software components 150 may be directly executed, or interpreted and then executed, by processors 124 of hardware platforms 120.

The software components 150 stored on hardware platforms 120 may be the same or different. Furthermore, each of hardware platforms 120 may have stored thereon more than one copy of the same software component.

Two software components 150 are the same if they are the identical copies of one another, for example the same version of the same library having the same patches applied. Two of software components 150 may be different if:
- they are entirely different software components, for example a java.lang package versus a java.math package;
- they are different implementations of the same type of software component, for example a java.math package versus a cmath library;
- they are different versions of the same implementation of a software component, for example two different versions of java.lang package; or
- they are the same version of the same implementation of a software component, but have had different patches installed.

Software components 150 may comprise libraries such as Java Archive (JAR) files or Dynamic Linked Library (DLL) files. Where software components 150 comprise libraries, two of software components 150 may be different if:
- they are entirely different libraries implemented in different software languages;
- they are different libraries implemented in the same software language; or
- they are different versions of the same library implemented in the same software language, for example an older and a newer version of the same library, or one copy of a library which has been patched and another copy of the library which has not.

FIG. 1A depicts an example embodiment of computer system 100 comprising two hardware platforms 120. However, system 100 may comprise any number of hardware platforms 120, including a single hardware platform. Furthermore, hardware platforms 120 may comprise one or more real hardware platforms 120, and/or one or more virtual hardware platforms (not shown). A virtual hardware platform may, for example, comprise a virtual machine or a virtual server implemented in a virtualization environment. Examples of the many commercially available virtualization environments include VMware™ and Red Hat Virtualization™.

One or more of memory 122, processor 124, and network adapter 126 may be shared between hardware platforms 120, for example where hardware platforms 120 comprise two or more virtual hardware platforms. Where hardware platforms 120 comprise two or more virtual hardware platforms, one or more of memory 122, processor 124, and network adapter 126 may be shared between two or more virtual hardware platforms.

Where system 100 comprises multiple hardware platforms 120, software components 150 may be copied between hardware platforms 120. For example, when hardware platforms 120 are added to system 100, the added hardware platforms may be based on an existing hardware platform and copy software components 150 from the existing hardware platform. Hardware platforms added to system 100 may also be based in part on an existing hardware platform, wherein one or more software components 150 of the new hardware platform are copied from the existing hardware platform, and one or more software components 150 of the new hardware platform are new.

In systems comprising virtual hardware platforms, virtual hardware platforms may be dynamically created and/or destroyed in response to system demand. In such systems, software components 150 of virtual hardware platforms may be based on a template. Software components 150 in the virtual hardware platform template may be updated over time, causing the software components 150 in new virtual hardware platforms to differ from the software components 150 in previously created virtual hardware platforms.

One or more of software components 150 may contain a security vulnerability.

Examples of vulnerabilities include:
- memory safety violations such as buffer overflows and dangling pointers;
- input validation errors;
- broken authentication and session management; and
- privilege-confusion bugs.

If any of software components 150 contain a vulnerability, then all of computer system 100 may be compromised by a nefarious actor exploiting the vulnerability. For example, if a nefarious actor exploits a buffer overflow vulnerability in a compromised software component 150 of a hardware platform 120, then the actor may be able to install their own nefarious software component on hardware platform 120. The actor may then be able to control hardware platform 120 via the nefarious software component. By using compromised hardware platform 120 and exploiting network 140, the actor may then further install nefarious software components on other hardware platforms 120, even if none of the software components 150 stored on the other hardware platforms 120 contain the vulnerability. As such, all of computer system 100 may be compromised by a single vulnerability in any of software components 150.

When a vulnerability is discovered in any of software components 150, the developer of the compromised software component will typically issue a patch to fix the vulnerability. When a patch is released, it must then be applied to any of software components 150 which contain the vulnerability.

One or more of software components 150 may contain an unpatched vulnerability for various reasons, including:
- the vulnerability may not be known by the developer of the compromised software component;
- the developer of the compromised software component may not have released a patch to fix the vulnerability; or
- the patch may not have been applied to the compromised software component.

Applying a patch to all instances of a compromised software component in system 100 may be logistically complex and burdensome. An inventory of software components 150 stored in system 100 may become inaccurate as real and virtual hardware platforms are added, removed, and updated. Without an accurate inventory of software components 150, all compromised software components may not be patched.

Compromised software components may not be patched for other reasons, for example:
- a patch may modify a software component in some additional undesirable manner other than merely fixing a vulnerability;
- a patch may introduce bugs, errors, and/or new vulnerabilities into the software component;
- a patch may have preconditions to being installed wherein the preconditions are not met (some preconditions are difficult or impossible to meet); and/or
- a system administrator may have determined that the cost and/or risk of installing a patch to remove a vulnerability in a software component is greater than the cost and/or risk of leaving the vulnerability in place.

In accordance with some embodiments of the present invention, one or more of software components 150 may be switched between an activated status and a deactivated status. When a software component is in an activated status, any functionality of the software component may be executed. When a software component is in a deactivated status, no functionality of the software component may be executed.

In some embodiments, existing software components 150 may be modified to add functionality to switch between an activated status and a deactivated status.

Software components 150 may be deactivated for various reasons, including because they are known to contain an unpatched vulnerability. By deactivating compromised software components, system 100 is protected from exploitation of those compromised software components by a nefarious actor.

Other reasons software components 150 may be deactivated include:
- they are not used by system 100;
- they are only used by system 100 under certain conditions, for example:
- they are only used during a certain period of time, for example at night or within a day of an end of a month;
- they are only used during certain scheduled processes, for example during start-up or shutdown of system 100;
- they provide undesired functionality; and/or
- to test a functionality of system 100 when system 100 is operating without one or more of software components 150.

In some embodiments, unused software components 150 may be deactivated to minimize the avenues of attack on system 100, even if no (known) vulnerabilities are associated with the component at the time of deactivation.

Software components 150 may be switched to an activated status by setting an activation setting to ACTIVE and to a deactivated status by setting an activation setting to INACTIVE.

Control unit 110 may communicate with hardware platforms 120 via network 140. Control unit 110 may be further configured to set an activation setting of software components 150. In some embodiments, control unit 110 is configured to set an activation setting of software components 150 containing vulnerabilities to INACTIVE.

Control unit 110 may communicate with vulnerability database 160. Vulnerability database 160 may contain a set of software component identifiers and vulnerabilities. Control unit 110 may be configured to match identifiers of software components 150 stored on hardware platforms 120 to the software component identifiers in vulnerability database 160, and to set the activation status as INACTIVE for any of software components 150 with an identifier matching any of the software component identifiers in vulnerability database 160 containing a vulnerability. By setting an activation status of any of software components 150 containing a vulnerability in vulnerability database 160 as INACTIVE, system 100 is protected from exploitation of any of the vulnerabilities in vulnerability database 160.

Database 160 may comprise a public database like the National Vulnerability Database provided by the National Institute of Standards and Technology (NIST), a commercial database, or a proprietary database. In some embodiments, control unit 110 is communicatively coupled to two or more vulnerability databases, for example a proprietary database and a public database. In such embodiments, control unit 110 is configured to match software components 150 to the software components in any of the communicatively coupled vulnerability databases, and deactivate any of software components 150 known to contain vulnerabilities.

In some embodiments, control unit 110 may generate a list of software components 150 stored on hardware platforms 120 containing a vulnerability, and present the list to a user through a user interface of control unit 110. Using the user interface of control unit 110, the user may then select compromised software components for control unit 110 to deactivate and/or selectively override decisions made by control unit 110 to deactivate certain software components 150.

Figure 2A:
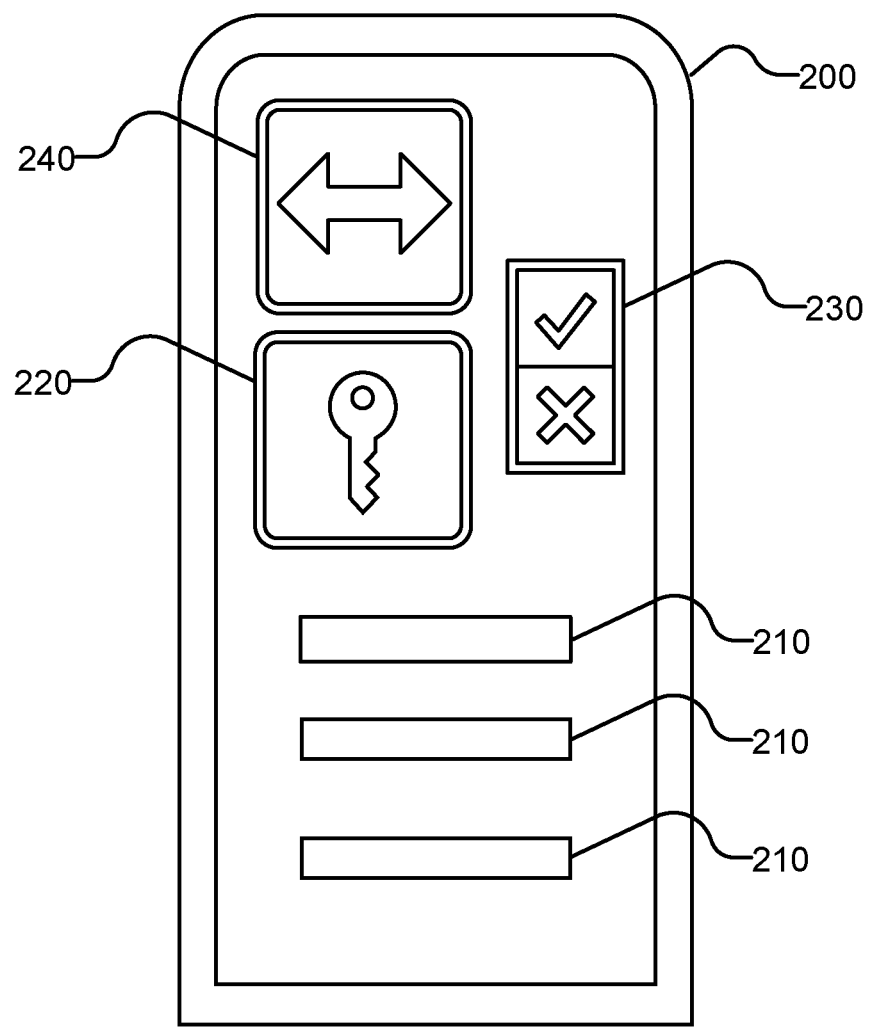
FIG. 2A is a schematic diagram of a software component according to an example embodiment.

FIG. 2 depicts an embodiment of software component 150 comprising library 200. Library 200 comprises one or more base functions 210 for providing the library functionality. A function is a sequence of instructions encoded in a software language executable by a processor, or interpretable by an interpreter. For example, library 200 may comprise a JAR file, the JAR file may comprise one or more Java™ .class files, and each of the .class files may comprise one or more Java™ functions known as methods.

Functions 210 of library 200 may be called by each other, or by a function of any other software component 150 which may communicate with library 200. For example, a network adapter 126 of a hardware platform 120 may receive a communication, wherein the communication is a function call to a target function 210 of a library 200 stored in memory 122 of hardware platform 120.

Library 200 further comprises gateway function 220 and activation setting 230. Activation setting 230 is configured to be set to ACTIVE or INACTIVE. One or more of base functions 210 are configured to call gateway function 220, and to execute gateway function 220 before further executing any other functionality. In some embodiments, all of base functions 210 are configured to call gateway function 220, and to execute gateway function 220 before executing any other functionality.

When one of target functions 210 is called, the target function 210 first calls gateway function 220. When gateway function 220 is called, gateway function 220 will query activation setting 230. If activation setting 230 is set to ACTIVE, gateway function 220 will execute without interruption, and return to the target function 210 which can then perform the functionality of the target function 210. If activation setting 230 is set to INACTIVE, gateway function 220 will terminate the execution of target function 210.

Gateway function 220 may terminate the execution of the target function 210 in one or more ways, including by:
shutting down system 100;
shutting down the hardware platform executing the target function 210;
returning a default value to the calling function instead of a value returned by target function 210; and/or
raising or throwing an exception.

In some embodiments, gateway function 220 may terminate the execution of the target function 210 by:
identifying a data type expected to be returned by the target function 210;
generating a random or default value of the data type;
returning the generated value; and
terminating execution of the target function 210.

In some embodiments, gateway function 220 terminates execution of target function 210 by indicating to the calling function that an unwanted event has occurred, and terminating the continued execution of the target function 210. For example, gateway function 220 may raise or throw an exception, for example a general exception such as an out-of-memory exception or an out-of-disk exception, or a specific exception such as an illegal access exception.

When gateway function 220 throws an exception, gateway function 220 may terminate the function call to target function 210 and return an exception object.

In some embodiments, when gateway function 220 permits a function call to a target function 210, gateway function 220 completes execution uninterrupted, and returns to the target function 210 upon completion.

Library 200 may further comprise control function 240. In some embodiments, control function 240 is configured to receive activation commands and deactivation commands from control unit 110. When control function 240 receives an activation command, control function 240 sets activation setting 230 to ACTIVE. When control function 240 receives a deactivation command, control function 240 sets activation setting 230 to INACTIVE.

In some embodiments, control function 240 is configured to retrieve activation information from control unit 110. Activation information may comprise one or more activation settings, and vulnerability information. Control function 240 may be configured to periodically retrieve activation information from control unit 110, for example every 1 minute, 2 minutes, or 3 minutes. Control function 240 may be further configured to parse the retrieved activation information, and update activation setting 230 in accordance with the retrieved activation information. For example, if the retrieved activation information contains an indication that library 200 contains a vulnerability, then control function 240 may set activation setting 230 to INACTIVE. If the retrieved activation information does not contain an indication that library 200 contains a vulnerability, then control function 240 may set activation setting 230 to ACTIVE.

In some embodiments, a single control function 240 may be shared between two or more libraries 200. In such embodiments, the shared control function 240 may be configured to periodically retrieve activation information for each of the two or more libraries 200 from control unit 110A. Shared control function 240 may be further configured to parse the retrieved activation information, and update the two or more activation settings 230 of the two or more libraries 200 based on the retrieved activation information.

By one or more control functions 240 updating activation settings 230, libraries 200 may be activated and deactivated. As described above, one reason for deactivating one or more of libraries 200 may be because one or more of libraries 200 are known to contain a vulnerability. By deactivating libraries 200 when libraries 200 are known to contain vulnerabilities, the system comprising libraries 200 is protected from exploitation of the vulnerabilities.

In some embodiments, one or more of gateway functions 220 comprise a call count list, wherein a call count list comprises a set of identifiers corresponding to base functions 210 in a software component, and a corresponding count representing a number of times that each of base functions 210 has been called. In such embodiments, control function 240 may periodically call gateway functions 220 and retrieve the call count list from each of gateway functions 220, and transmit the call count lists to control unit 110.

Figure 2B:
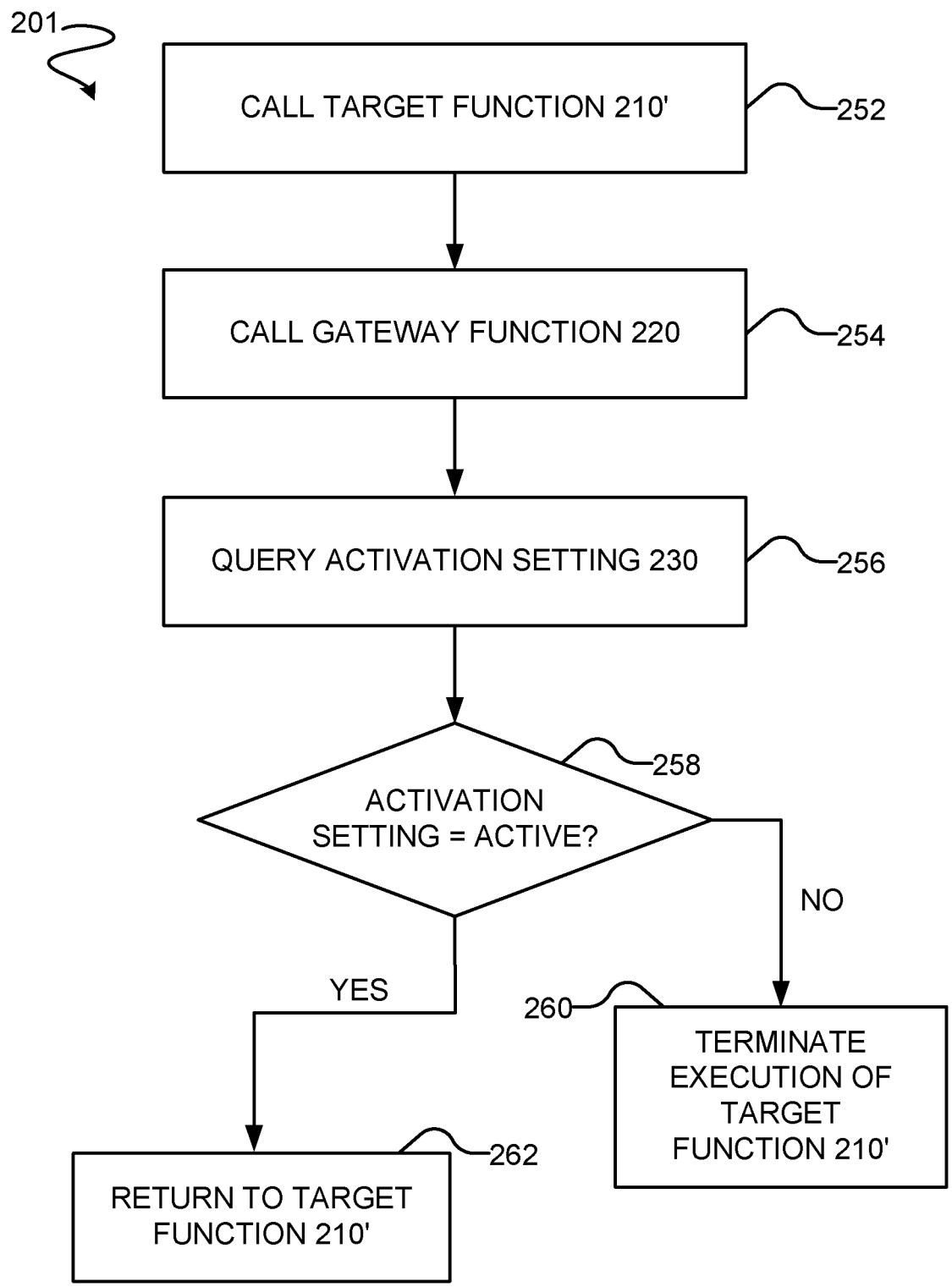
FIG. 2B is depicts method for calling a target function according to an example embodiment.

FIG. 2B depicts a method 201 for calling a target function 210' of a library 200. Method 201 comprises:
step 252: calling a target function 210';
step 254: calling a gateway function 220;
step 256: querying an activation setting 230;
step 258: determining if the activation setting 230 is set to ACTIVE;
step 260: if the activation setting 230 is not set to ACTIVE, terminating the execution of target function 210'; and
step 262: if the activation setting 230 is set to ACTIVE, returning to target function 210'.

Figure 3:
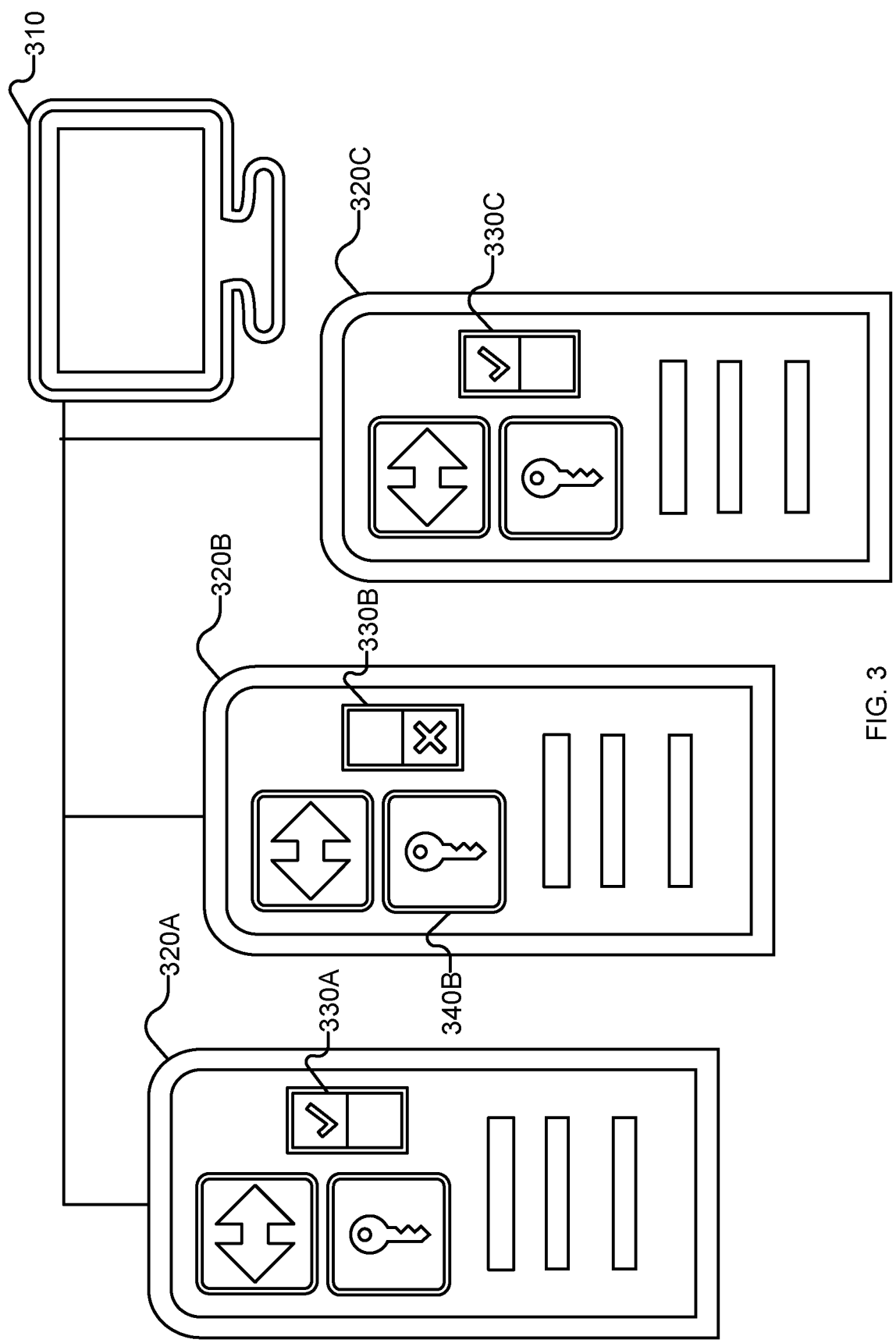
FIG. 3 is a schematic diagram of a hardware platform storing software components according to an example embodiment.

FIG. 3 depicts an example embodiment of a hardware platform 310 comprising a memory having stored thereon three software components 320A, 320B and 320C (collectively software components 320), and three corresponding activation settings 330A, 330B and 330C (collectively activation settings 330). The memory comprising hardware platform 310 may comprise volatile memory such as Random Access Memory (RAM), and/or non-volatile memory such as a hard drive or disk drive. Software components 320 and activation settings 330 may be stored in any memory comprising hardware platform 310, including in a combination of volatile and non-volatile memory.

As depicted in FIG. 3, activation settings 330A and 330C are set to ACTIVE, and activation setting 330B is set to INACTIVE. Activation setting 330B may be set to INACTIVE if, for example, software component 320B is known to contain a vulnerability.

Gateway function 340B terminates any function calls to software component 320B, thereby preventing any exploitation of the vulnerability contained in software component 320B.

Figure 4A:
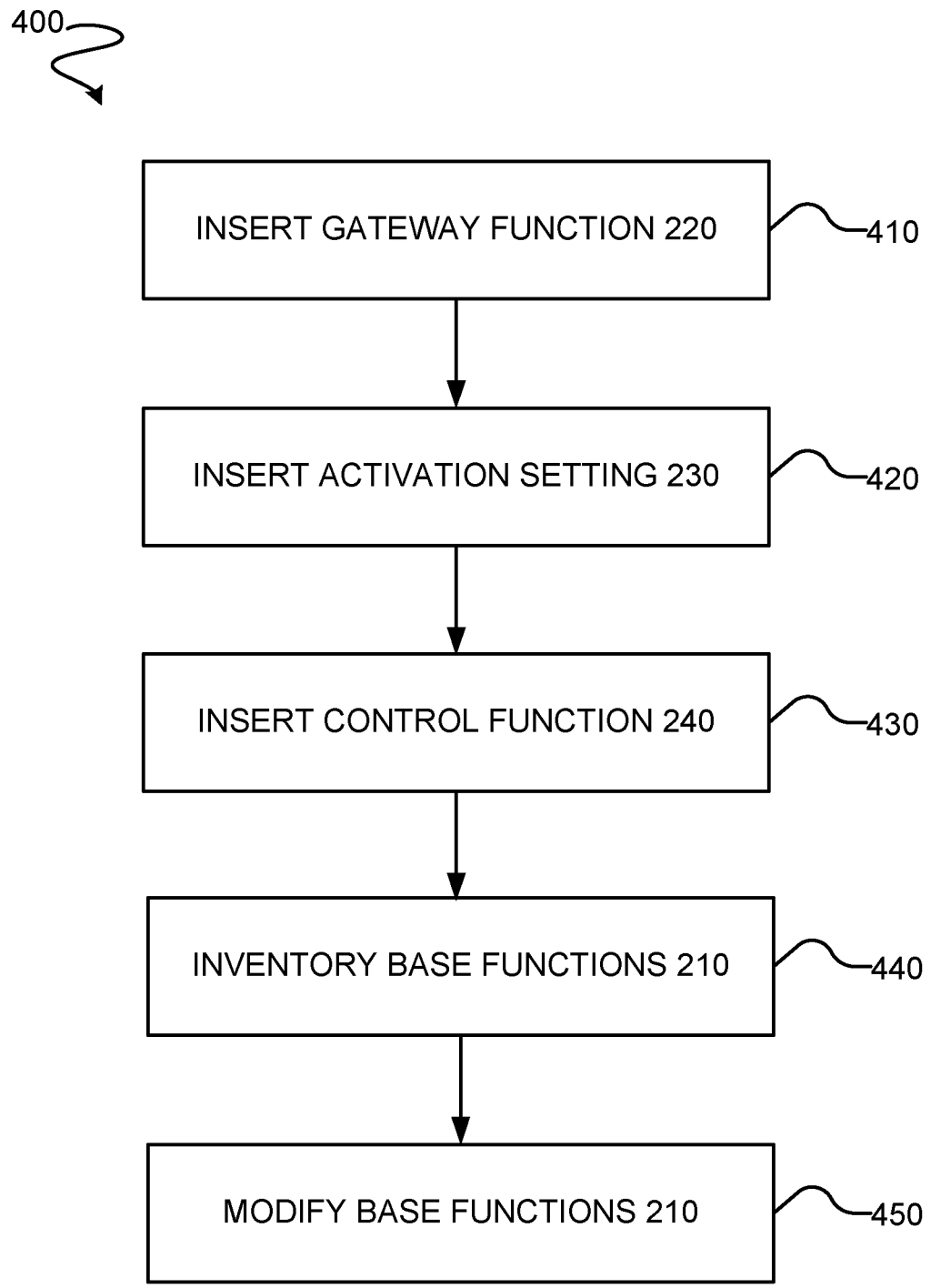
FIG. 4A depicts a method for modifying a software component according to an example embodiment.

FIG. 4A depicts an example method 400 for modifying a software component 150 to add gateway function 220, activation setting 230, and control function 240. Method 400 comprises:

step 410: insert gateway function 220 into software component 150;
step 420: insert activation setting 230 into software component 150;
step 430: insert control function 240 into software component 150;
step 440: inventory base functions 210;
step 450: modify base functions 210.

Steps 410 and 430 may comprise adding function definitions to software component 150. For example, where software component 150 comprises a JAR file, step 410 may comprise adding a .class file to the JAR file wherein the .class file comprises methods implementing gateway function 220 and control function 240.

Step 420 may comprise inserting activation setting 230 into gateway function 220. For example, where software component 150 comprises a JAR file and gateway function 220 is implemented as a method in the JAR file, the method implementing gateway function 220 may store activation setting 230 as a variable within the method.

Figure 4B:
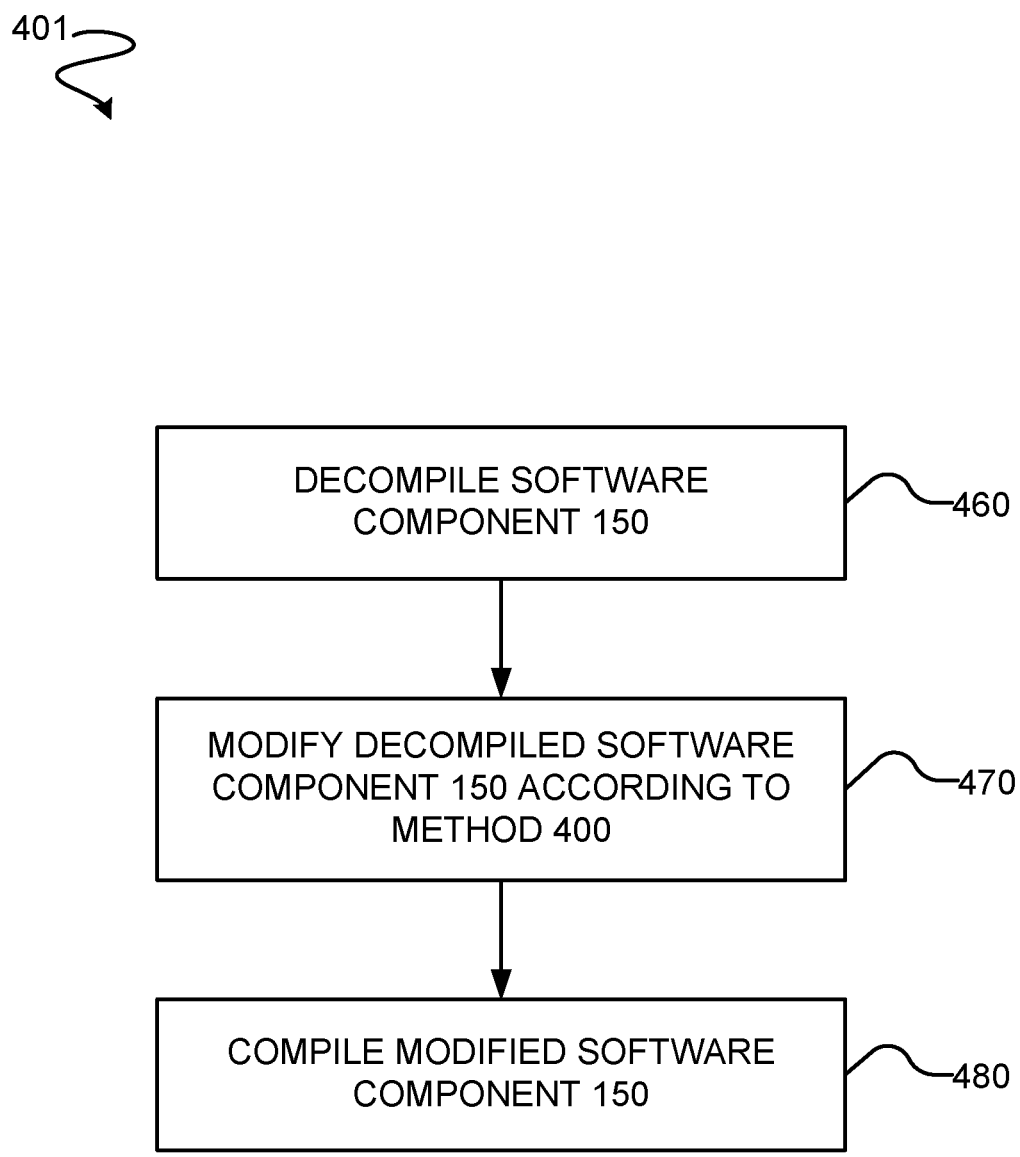
FIG. 4B depicts a method for modifying a software component according to another example embodiment.

FIG. 4B depicts an example method 401 for modifying a software component 150 to add gateway function 220, activation setting 230, and control function 240, wherein software component 150 comprises an executable file. Method 401 comprises:

step 460: decompile software component 150;
step 470: modify decompiled software component 150 according to method 400; and
step 480: compile modified software component 150.

Figure 5A:
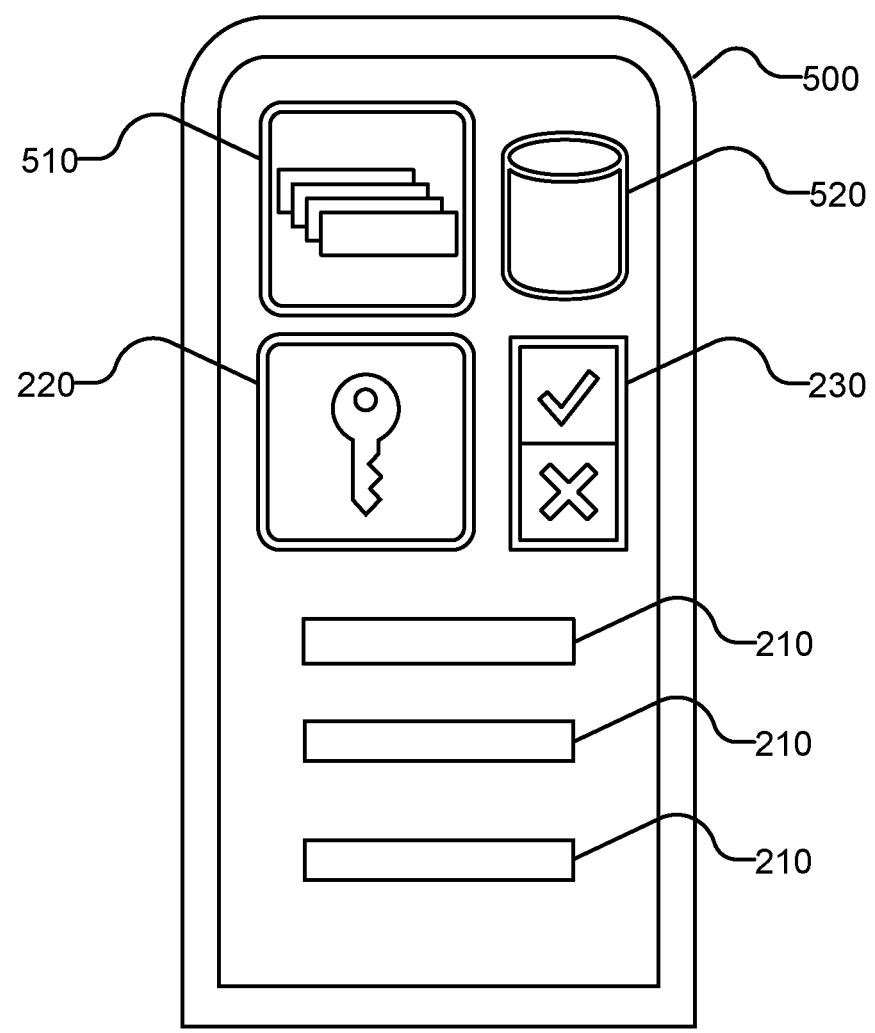
FIG. 5A is a schematic diagram of a software component according to another example embodiment.

FIG. 5A depicts an embodiment of a software library 500 comprising base functions 210, gateway function 220, activation setting 230, utility functions 510 and metadata 520. Utility functions 510 may comprise control function 240 described above.

Figure 5B:
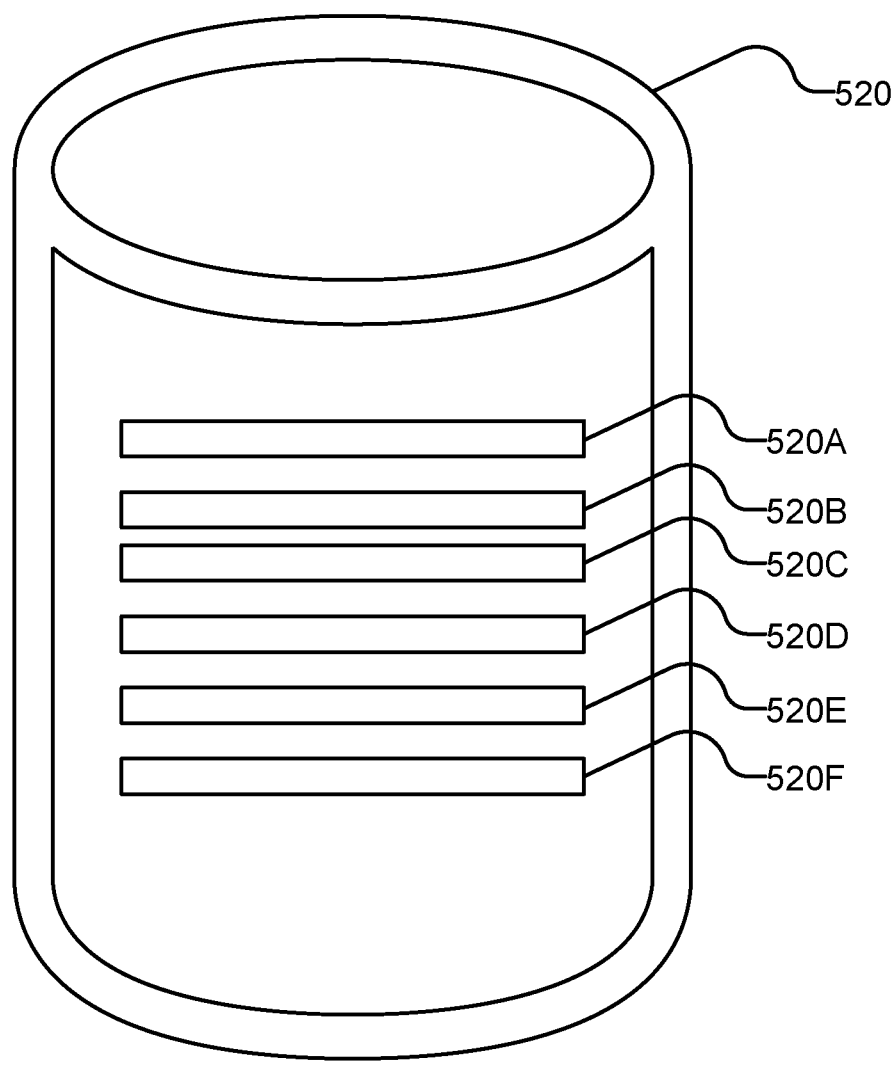
FIG. 5B is a schematic diagram of metadata according to an example embodiment.

FIG. 5B depicts an example embodiment of metadata 520. Metadata 520 may comprise one or more of:

a unique identifier, 520A;
a name of library 500, 520B;
a version of library 500, 520C;
a list of base functions 210, 520D;
a location of library 500, 520E; and
environment information 520F.

Environment information 520F may include hardware information and/or software information. Hardware information may include information describing the processor, memory, network adapter, and/or other hardware of a hardware platform. Software information may include information describing the software of a hardware platform.

Utility functions 510 may further include functions for setting, updating, and/or querying any of metadata 520. Utility functions 510 may be called by one or more of: gateway function 220, control function 240, utility functions 510, and control unit 110. In some embodiments, gateway function 220 periodically updates metadata 510.

Library 500 may be modified to add utility functions 510 similar to the addition of control function 240 in step 430 above, and to add metadata 520 similar to the addition of activation setting 230 in step 420 above.

Figure 6:
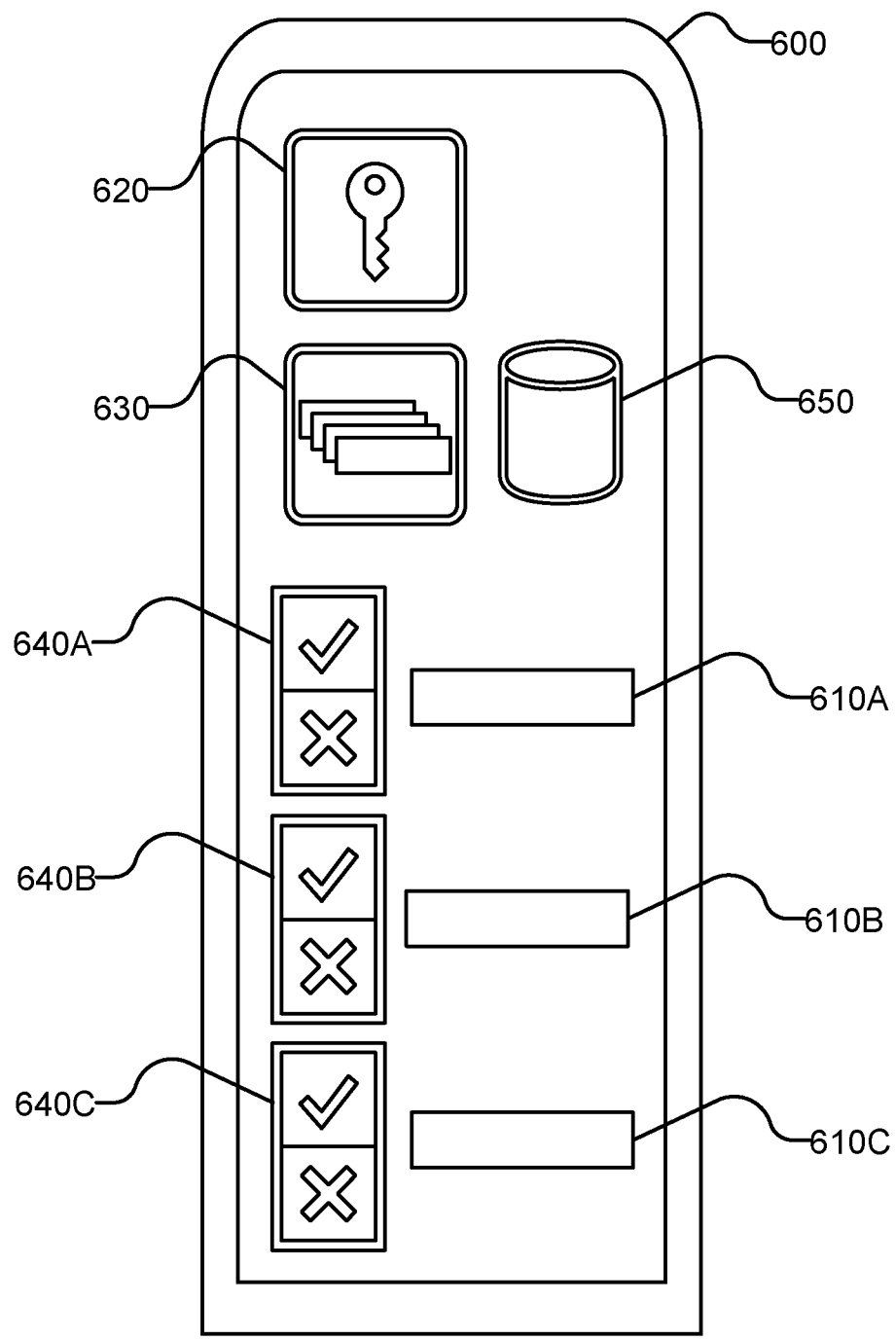
FIG. 6 is a schematic diagram of a software component according to another example embodiment.

FIG. 6 depicts an embodiment of a software library 600 comprising one or more base functions 610, gateway function 620, utility functions 630, one or more function activation settings 640, and metadata 650.

In the embodiment depicted in FIG. 6, library 600 comprises three base functions 610A, 610B and 610C, and three function activation settings 640A, 640B and 640C corresponding respectively to base functions 610A, 610B and 610C. However, library 600 may comprise any number of base functions 610, and a number of function activation settings 640 corresponding to the number of base functions 610.

Each of base functions 610 has a function identifier. Each of function activation settings 640 are configured to be set to ACTIVE or INACTIVE.

Each of base functions 610 are configured to first call and execute gateway function 220, before executing any functionality in base functions 610.

When a target one of functions 610 is called, the target function 610 first calls gateway function 620. When gateway function 620 is called, gateway function 620 will query the target function activation setting 640 corresponding to the target function 610. For example, if target function 610 is function 610A, then gateway function 620 will query function activation setting 640A.

If the activation setting 640 corresponding to the target function 610 is set to ACTIVE, gateway function 620 will return to the target function 610, and the target function 610 will resume execution. If the target function activation setting 640 corresponding to the target function 610 is set to INACTIVE, gateway function 620 will terminate the function call to the target function 610. Gateway function 620 may terminate a function call to target function 610 as described above, for example.

Utility functions 630 may comprise a granular control function 632 (not shown). Granular control function 632 is configured to receive function activation commands and function deactivation commands. Function activation commands and function deactivation commands each comprise a function identifier.

When granular control function 632 receives a function activation command, granular control function 632 sets the function activation setting 640 corresponding to the one of functions 610 corresponding to the function identifier in the function activation command to ACTIVE. For example, if granular control function 632 receives a function activation command containing a function identifier for function 610A, then granular control function 632 would set function activation setting 640A to ACTIVE.

When granular control function 632 receives a function deactivation command, granular control function 632 sets the function activation setting 640 corresponding to the one of functions 610 corresponding to the function identifier in the function deactivation command to INACTIVE. For example, if granular control function 632 receives a function deactivation command containing a function identifier for function 610A, then granular control function 632 would set function activation setting 640A to INACTIVE.

In some embodiments, granular control function 632 is configured to retrieve activation information from control unit 110. Activation information may comprise an activation setting, and vulnerability information. Granular control function 632 may be configured to periodically retrieve activation information from control unit 110, for example ever 1 minute, 2 minutes, or 3 minutes. Granular control function 632 may be further configured to parse the retrieved activation information, and update activation settings 640 in accordance with the retrieved activation information. For example, if the retrieved activation information contains an indication that base function 640B contains a vulnerability, then granular control function 632 may set activation setting 640B to INACTIVE. If the retrieved activation information does not contain an indication that a base function 610 contains a vulnerability, then granular control function 632 may set the activation setting 640 corresponding to the base function 610 to ACTIVE.

Function activation settings 640 may be set to INACTIVE for various reasons, including because the corresponding function is known to contain an unpatched vulnerability. By deactivating compromised functions, library 600 is protected from exploitation of those compromised functions by a nefarious actor.

Figure 7:
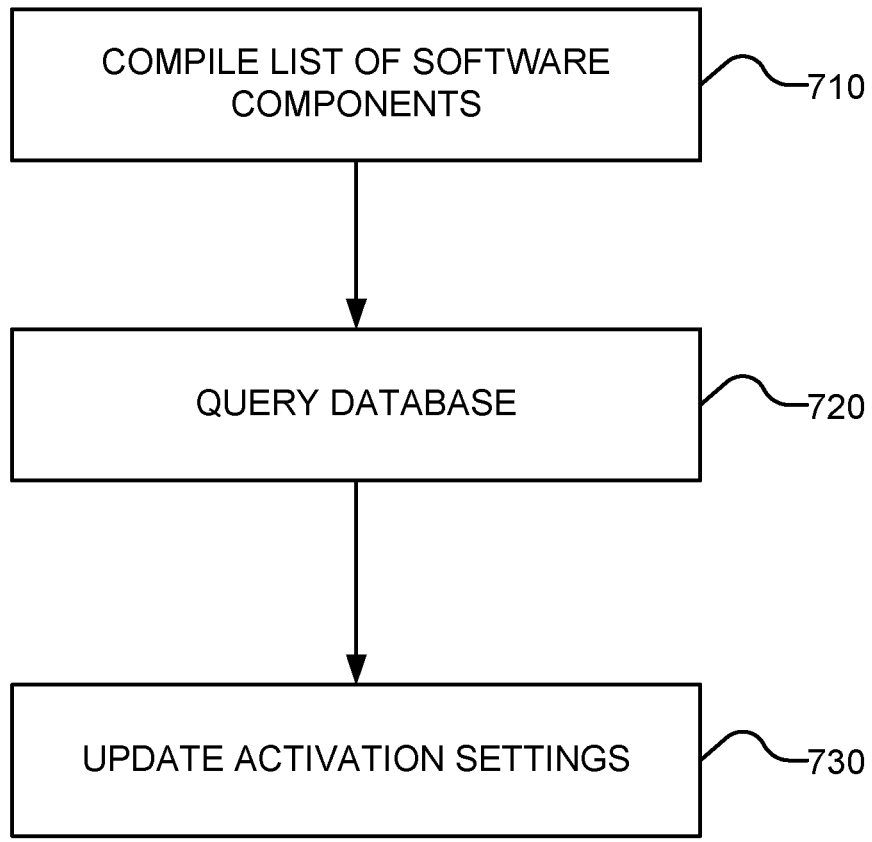
FIG. 7 is a method for securing a computer system according to an example embodiment.
Figure 8:
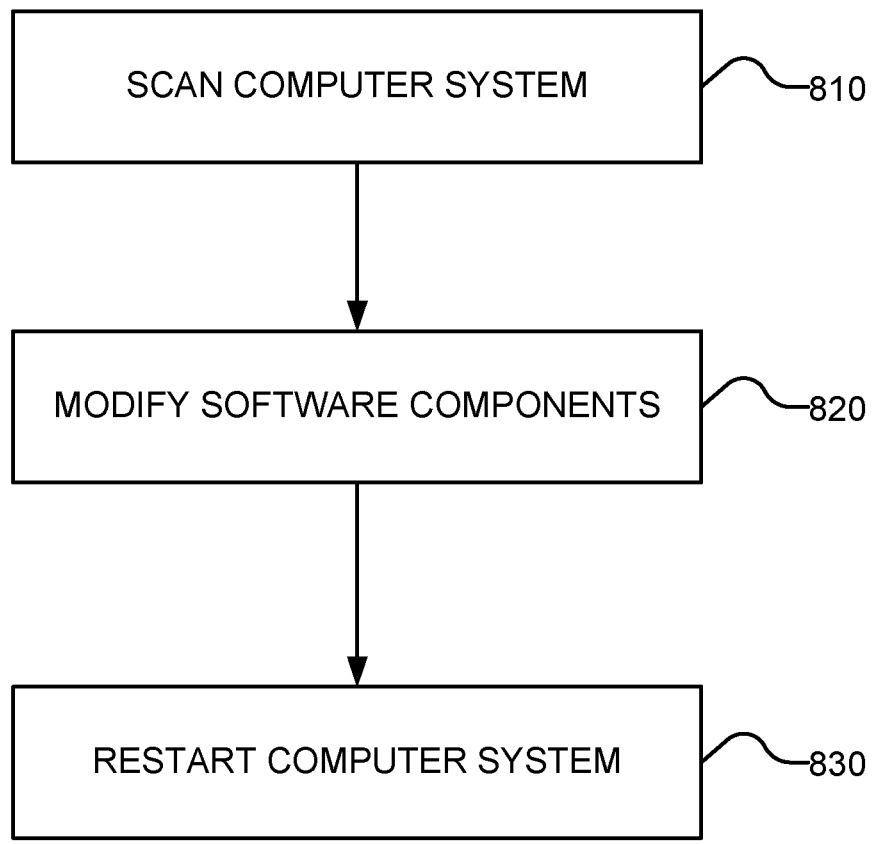
FIG. 8 is a method for securing a computer system according to another example embodiment.

In some embodiments, control unit 110 is configured to secure hardware platforms 120 according to method 700, as depicted in FIG. 7. Method 700 comprises:
- step 710: compiling a list of software components 150 that are installed on hardware platforms 120;
- step 720: querying database 160; and
- step 730: updating activation settings 230.

In step 710, control unit 110 may compile a list of software components 150 by querying metadata 520 of software components 150, or by receiving metadata 520 of software components 150. The compiled list of software components 150 may comprise a name, version, and location of each of software components 150. The compiled list may further comprise a list of all base functions in software components 150.

In some embodiments, control function 240 periodically transmits metadata 520 and/or call count lists from software components 150 to control unit 110. In some embodiments, control unit 110 may retrieve metadata 520 and/or call count lists from software components 150 by calling a utility function 510 of software components 150. Metadata 520 transmitted to and/or received by control unit 110 may comprise a name, version, and location of software components 150. Metadata 520 may further comprise a list of base functions in software components 150.

Some embodiments of control unit 110 comprise database 170 of identifiers of software components 150. Where control unit 110 comprises database 170, step 710 may comprise control unit 110 querying database 170 for a list of identifiers of software components 150 stored on hardware platforms 120.

In step 720, control unit 110 may query database 160 for a list of software components 150 containing vulnerabilities. For example, control unit 110 may query database 160 for a list of software components containing vulnerabilities with a name and a version matching any name and version of software components 150. Control unit 110 may then flag those software components 150 in database 170 as containing vulnerabilities.

Step 720 may comprise control unit 110 querying two or more databases of vulnerabilities. For example, control unit 110 may query a local proprietary database, and an external third-party database. Where control unit 110 queries two or more databases, control unit 110 may compile a single list of vulnerabilities from two or more lists of vulnerabilities received from two or more databases.

In step 730, activation settings 230 of software components 150 are updated. Activation settings 230 may be updated by control unit 110 calling control functions 240 of software components 150. Activation settings 230 may be updated by control functions 240 of software components 150 periodically retrieving current activation settings from control unit 110.

In some embodiments, control unit 110 is configured to secure system 200 comprising one or more software components 150 according to example method 800.

Method 800 begins with step 810, scanning computer system 100 and identifying software components 150. Scanning 810 may comprise control unit 110 reading a memory shared between control unit 110 and software components 150, for example where control unit 110 and software components 150 are installed on the same hardware platform and share a memory. Scanning 810 may comprise control unit 110 remotely accessing a memory where software components 150 are installed, for example where control unit 110 is installed on a separate hardware platform than software components 150, and the two or more hardware platforms are communicatively coupled by a local area network (LAN), or the internet.

Step 810 may comprise control unit 110 systematically reading the entire memory of hardware platforms 120. For example, control unit 110 may read through the entire file system stored on the memory of computer system 100 and identify all software components 150 in computer system 100. For example, control unit may identify software components 150 by reading a file name of software components 150.

Step 810 may further comprise control unit 110 identifying each of software components 150 in computer system 100. Control unit 110 may identify software components 150 by calculating a hash of software component 150, and comparing the hash of software component 150 to a list of known hashes for known software components. If the hash of a software component 150 is in the list of known software component hashes, control unit 110 may add software component 150 to a list of identified software components. The list of identified software components may include the names of software components 150 and the locations of software components 150.

If the hash of a software component 150 is not in the list of known software component hashes, control unit 110 may either ignore the unidentified software component, or flag the software component as unidentified.

Method 800 further comprises step 820, modifying known software components 150. In step 820, each of known software components 150 is modified to add gateway function 220, control function 240, activation setting 230, and for one or more base functions to call to control function 240.

Method 800 may comprise step 830, restarting computer system 100. The modifications to software components 150 may not become effective if software components 150 are currently running, for example if one or more of software components 150 are loaded into working memory like RAM.

Figure 9:
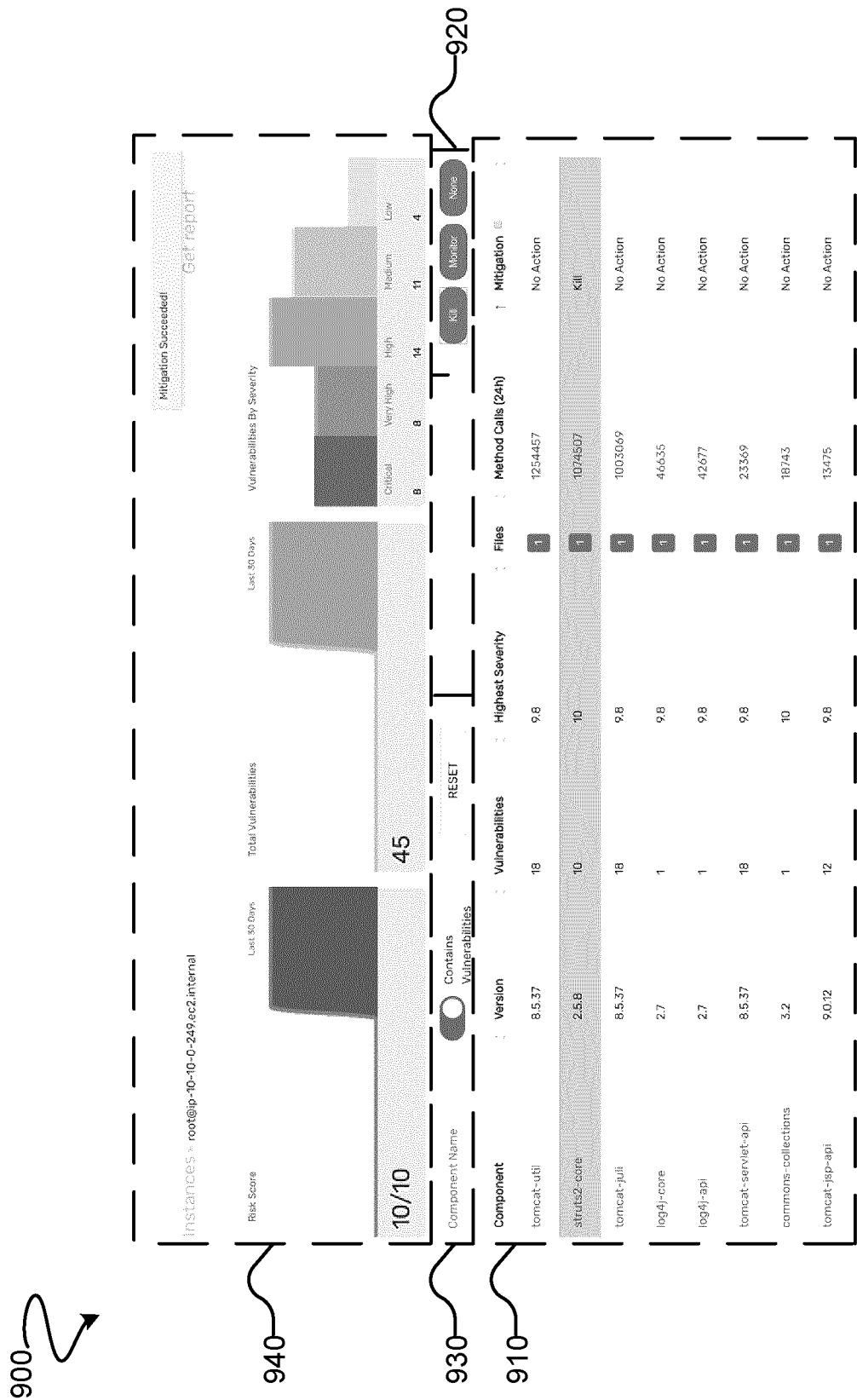
FIG. 9 is an schematic diagram of a graphical user interface of a control unit according to an example embodiment.

In some embodiments of control unit 110, control unit 110 comprises a graphical display 900. A non-limiting example of such a display is depicted in FIG. 9. Graphical display 900 comprises list 910 of software components 150 in computer system 100. In some embodiments, list 910 of software components 150 may comprise, for one or more of software components 150 in list 910, one or more of:
- a component name, for example where the component comprises a library, a library name;
- a version number indicating the version of the software component;
- a vulnerability count indicating the number of known vulnerabilities contained in the software component;
- a highest severity level indicating the highest severity level of a vulnerability contained in the software component;
- a file count indicating a number of files comprising the software component;

a method call count indicating the number of times a method of the software component has been called within a period, for example within the past 24 hours; and a mitigation indicator, indicating if any mitigation has been taken for the software component, for example deactivating the software component.

In some embodiments, control unit 110 may be configured to assign or retrieve a severity level for any vulnerabilities contained in software components 150. A severity level may comprise a numeric value, for example a number between 1 and 10 based on the following ranges:

| Severity Level | Numeric Range |
|---|---|
| None | 0.0 |
| Low | 0.1-3.9 |
| Medium | 4.0-6.9 |
| High | 7.0-8.9 |
| Critical | 9.0-10.0 |

Graphical display 900 may further comprise filter 930, wherein filter 930 may filter the software components displayed in list 910, for example by filtering to display only software components with a component name containing a word, and/or to display only software components containing at least one vulnerability, and/or to display only software components containing a vulnerability associated with a severity level that exceeds some threshold.

Graphical display 900 may further comprise controls 920. Controls 920 may permit deactivating and activating software components 150. In some embodiments, controls 920 may control an activation status of a selected software component in list 910.

Graphical display 900 may further comprise summary display 940. Summary display 940 may display in text and/or graphical form a risk score for system 100, a total number of vulnerabilities contained in system 100, and/or a total number of vulnerabilities contained in system 100 by severity level. The risk score for system 100 may be based on the highest severity vulnerability contained within an active software component of system 100.

Figure 10A:
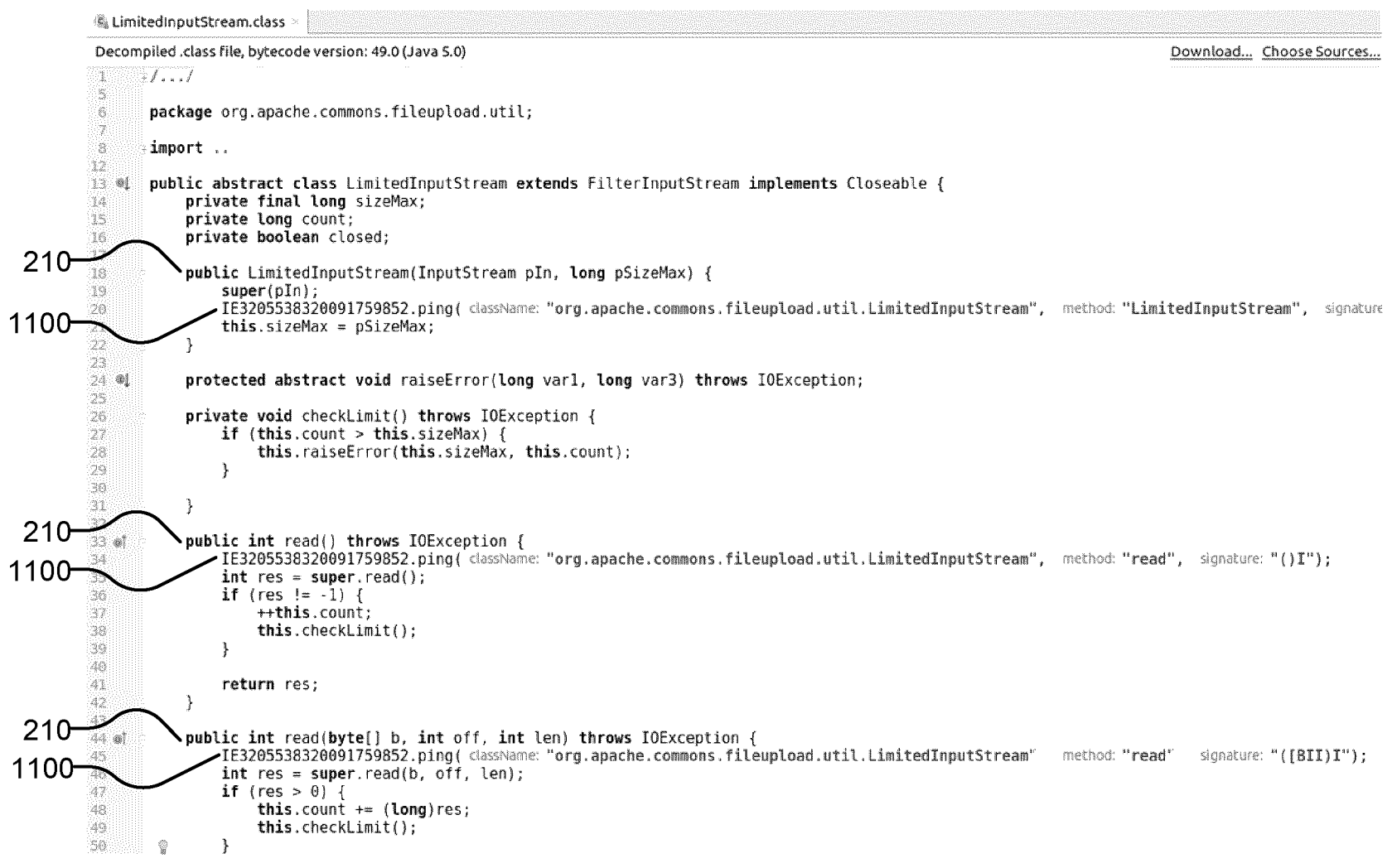

FIG. 10A depicts example base functions 210 implemented in Java™ and modified in accordance with an example embodiment. Each base function 210 contains a gateway function call 1100 to gateway function 220. Gateway function call 1100 may comprise one or more arguments identifying base functions 210. For example, function call 1100 by a particular base function 210 may comprise one or more of:

a class name argument indicating a name of the class comprising the base function 210;

a method name argument indicating a name of the base function 210; and a signature argument indicating one or more of an input of the base function 210 and an output of the base function 210.

FIG. 10B depicts an example embodiment of gateway function 220 implemented in Java™. Gateway function 220 may comprise:

hash map 1200, wherein hash map 1200 comprises a list of pairs of identifiers of base functions 210 and activation settings;

a call count 1300; and a ping method 1400, wherein ping method 1400:

receives as arguments a class name, a method name, and a method signature of a base function 210;

queries hash map 1200 for an activation setting corresponding to the base function 210; and throws an exception if the activation setting corresponding to the base function 210 indicates that the base function 210 is inactive; otherwise, increments call count 1300 and returns.

In an example use case a computer system comprises a number of hardware platforms that comprise a number of hardware platforms that comprise a number (potentially a very large number) of software components 150. Some of the software components 150 may comprise vulnerabilities. A control until 110 is added to the computer system. The control unit 110 may, for example, be provided by a programmed computer added to the computer system and/or a software package executed on a computer of the system. The control unit may automatically modify the system to allow functions of software components 150 to be selectively made ACTIVE or INACTIVE (e.g. by using methods 400 and/or 401). The automatic modification may install gateway functions and activation settings as described above. The controller may also automatically determine whether the functions have known vulnerabilities and, if so, may automatically set the function to INACTIVE (e.g. using method 700 described above). An authorized user of the control unit may optionally override automatic selections made by the control unit. For example, the authorized user may:

use the control unit to switch an activation setting from INACTIVE to ACTIVE either:

until the authorized user sets the activation setting to INACTIVE; or for a set period of time; or until the control unit performs method 700 again;

set a schedule of the control unit to allow particular functions or groups of functions to execute according to a schedule, in which case the control unit may automatically set activation setting(s) for the function(s) to ACTIVE and then back to INACTIVE according to the schedule.

An authorized user of the control unit may also review the security of the computer system by reviewing the status of software components installed in the computer system, for example using a view as shown in FIG. 9.

As new vulnerabilities are discovered, the control unit may automatically flag and/or render INACTIVE software components affected by the vulnerability (e.g. by executing method 700).

Some embodiments are described herein as comprising activation setting 230 which may be set to ACTIVE or INACTIVE. Activation setting 230 may comprise any data accessible to gateway function 220 which is capable of indicating an active or an inactive status. For example, activation setting 230 may comprise one or more of:

a Boolean value wherein one of a "0" and a "1" indicates an active status and another of a "0" and a "1" indicates an inactive status;

a set of vulnerabilities wherein a null set indicates an active status and a set comprising at least one vulnerability indicates an inactive status;

a flag wherein a set flag indicates an active status or an inactive status; and any other set of data values which may be set to indicate an active or an inactive status.

Some embodiments described herein comprise control function 240 retrieving activation information from control unit 110. In some embodiments, control function 240 may receive activation information from control unit 110.

Some embodiments described herein comprise control function 240 retrieving or receiving activation information from control unit 110. In some embodiments, the activation information retrieving or receiving from control unit 110 may comprise:

activation information for all of system 100;
activation information for one or more of hardware platforms 120;
activation information for one or more of software components 150; and/or
activation information for one or more of base functions 210.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs")). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Software and other modules may reside on servers, workstations, personal computers, and the like.

The invention may also be provided in the form of a program product. The program product may comprise any non-transitory medium which carries a set of computer-readable instructions which, when executed by a data processor, cause the data processor to execute a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A method for securely operating a computer system, the method comprising:
    making a function call to a target function of a software component;
    calling, by the target function, a gateway function;
    querying, by the gateway function, an activation setting; and
    terminating, by the gateway function, the function call to the target function if the activation setting indicates an inactive status.

2. The method of claim 1, further comprising returning, by the gateway function, to the target function if the activation setting indicates an active status.

3. The method of claim 1, wherein the target function is a function of a software library, and the activation setting indicates an activation status of the software library.

4. The method of claim 1, wherein the activation setting indicates an activation status of the target function.

5. The method of claim 1, wherein the activation setting is stored in the software component.

6. The method of claim 1, wherein terminating the function call comprises shutting down the computer system.

7. The method of claim 1, wherein terminating the function call comprises:
    identifying, by the gateway function, a data type expected to be returned by the target function;
    generating, by the gateway function, a default value of the data type;
    returning, by the gateway function, the default value; and
    terminating, by the gateway function, the function call to the target function.

8. The method of claim 1, wherein terminating the function call comprises:
    returning, by the gateway function, an exception; and
    terminating, by the gateway function, the function call to the target function.

9. The method of claim 8, wherein returning an exception by the gateway function comprises returning an exception indicating an illegal access was attempted.

10. The method of claim 1, further comprising calling a control function, wherein calling the control function comprises:
    retrieving, by the control function, an updated value for the activation setting from a control unit; and
    updating, by the control function, the activation setting according to the updated value for the activation setting.

11. The method of claim 10, further comprising:
    receiving, by the control unit, an indication from a user to deactivate the software component; and
    setting, by the control unit, the updated value for the activation setting to indicate that the software component is inactive.

12. The method of claim 10, further comprising:
    identifying, by the control unit, the software component;
    querying, by the control unit, a vulnerability database for a list of vulnerabilities contained in the software component; and
    displaying, by the control unit, an indication that the software component contains a vulnerability if the list of vulnerabilities contained in the software component contains at least one vulnerability.

13. The method of claim 12, further comprising:
    setting, by the control unit, the updated value for the activation setting to indicate that the software component is inactive if the list of vulnerabilities contained in the software component contains at least one vulnerability.

14. The method of claim 1, further comprising:
    adding the gateway function to the software component; and
    modifying the target function to call the gateway function.

15. The method of claim 1, wherein the software component is a library.

16. A computer readable memory having stored thereon machine executable instructions, which when executed by a processor, cause the processor to perform the method of claim 1.

17. A computer system comprising:
    a control unit; and
    a hardware platform communicatively coupled to the control unit;
    wherein the hardware platform is configured to execute a plurality of software components, wherein each of the software components comprises:
    a gateway function; and
    at least one base function configured to call the gateway function; and
    wherein the gateway function is configured to query an activation setting and terminate the base function if the activation setting indicates an inactive status; and
    wherein the control unit is configured to set the activation setting.

18. The computer system of claim 17 wherein the gateway function is further configured to return to the base function if the activation setting indicates an active status.

19. The computer system of claim 17, wherein the gateway function is configured to terminate the base function by:
- identifying a data type expected to be returned by the base function;
- generating a default value of the data type;
- returning the default value; and
- terminating the base function.

20. The computer system of claim 17, wherein the gateway function is configured to terminate the base function by:
- returning an exception; and
- terminating the function call to the base function.

* * * * *